(12) United States Patent
De Haan et al.

(10) Patent No.: US 12,158,922 B2
(45) Date of Patent: Dec. 3, 2024

(54) GAUGE EQUIVARIANT GEOMETRIC GRAPH CONVOLUTIONAL NEURAL NETWORK

(71) Applicant: QUALCOMM TECHNOLOGIES, INC., San Diego, CA (US)

(72) Inventors: Pim De Haan, Amsterdam (NL); Maurice Weiler, Amsterdam (NL); Taco Sebastiaan Cohen, Amsterdam (NL); Max Welling, Bussum (NL)

(73) Assignee: QUALCOMM Technologies, Inc., San Diego, CA (US)

( * ) Notice: Subject to any disclaimer, the term of this patent is extended or adjusted under 35 U.S.C. 154(b) by 927 days.

(21) Appl. No.: 17/169,338

(22) Filed: Feb. 5, 2021

(65) Prior Publication Data

US 2021/0248504 A1     Aug. 12, 2021

Related U.S. Application Data

(60) Provisional application No. 62/971,129, filed on Feb. 6, 2020.

(51) Int. Cl.
| | | |
|---|---|---|
| *G06F 17/10* | (2006.01) | |
| *G06F 17/14* | (2006.01) | |
| *G06N 3/08* | (2023.01) | |
| *G06N 7/01* | (2023.01) | |
| *G06V 10/426* | (2022.01) | |
| *G06V 10/44* | (2022.01) | |

(Continued)

(52) U.S. Cl.
CPC ............ *G06F 17/10* (2013.01); *G06F 17/142* (2013.01); *G06N 3/08* (2013.01); *G06N 7/01* (2023.01); *G06V 10/426* (2022.01); *G06V 10/454* (2022.01); *G06V 10/764* (2022.01); *G06V 10/82* (2022.01)

(58) Field of Classification Search
CPC ..... G06F 17/10; G06F 17/142; G06V 10/454; G06V 10/82; G06V 10/426; G06V 10/764; G06N 7/01; G06N 3/08

See application file for complete search history.

(56) References Cited

PUBLICATIONS

T. S. Cohen, M. Weiler, B. Kicanaoglu, M. Welling, "Gauge Equivariant Networks and the Icosahedral CNN" (Herein referred as Cohen et al), 2019, pp. 1-10 (Year: 2019).*

(Continued)

*Primary Examiner* — Kibrom K Gebresilassie
(74) *Attorney, Agent, or Firm* — Patterson & Sheridan LLP

(57) ABSTRACT

Certain aspects of the present disclosure provide a method for performing machine learning, comprising: determining a plurality of vertices in a neighborhood associated with a mesh including a target vertex; determining a linear transformation configured to parallel transport signals along all edges in the mesh to the target vertex; applying the linear transformation to the plurality of vertices in the neighborhood to form a combined signal at the target vertex; determining a set of basis filters; linearly combining the basis filters using a set of learned parameters to form a gauge equivariant convolution filter, wherein the gauge equivariant convolution filter is constrained to maintain gauge equivariance; applying the gauge equivariant convolution filter to the combined signal to form an intermediate output; and applying a nonlinearity to the intermediate output to form a convolution output.

22 Claims, 7 Drawing Sheets

(51) Int. Cl.
*G06V 10/764* (2022.01)
*G06V 10/82* (2022.01)

(56) References Cited

PUBLICATIONS

Anonymous authors, "Gauge Equivariant Spherical CNNs" (herein referred as Anonymous authors) 2019, pp. 1-15 (Year: 2019).*

Anonymous: "Gauge Equivariant Spherical CNNS," Sep. 25, 2019 (Sep. 25, 2019), XP055767648, Retrieved from the Internet: URL: https://openreview.net/attachment?id=HJeYSxHFDS&name=original_pdf [retrieved on Jan. 21, 2021] abstract; Sections 1 and 3-6, paragraphs [0001], [0002], [0004], pp. 1-15.

Cohen T.S., et al., "Gauge Equivariant Convolutional Networks and the Icosahedral CNN", arxiv.org, Cornell University Library, 201 Olin Library Cornell University Ithaca, NY 14853, Feb. 11, 2019 (Feb. 11, 2019), XP081161914, Abstract, figures 1, 2, 4 paragraphs [0002]-[0004], [09.1], 14 Pages.

Haan P.D., et al., "Gauge Equivariant Mesh CNNs Anisotropic Convolutions on Geometric Graphs", arxiv.org, Cornell University Library, 201 Olin Library Cornell University Ithaca, NY 14853, Mar. 11, 2020 (Mar. 11, 2020), XP081619620, the Whole Document, 13 Pages.

International Search Report and Written Opinion—PCT/US2021/016971—ISA/EPO—Jun. 9, 2021.

Kissner M: "An Easy Guide to Gauge Equivariant Convolutional Networks", by Michael Kissner: Towards Data Science, May 24, 2019 (May 24, 2019), XP055808087, Retrieved from the Internet: URL:https://towardsdatascience.com/an-easy-guide-to-gauge-equivariant-convolutionalnetworks-9366fb600b70 [retrieved on May 27, 2021] the whole document, pp. 1-11.

\* cited by examiner

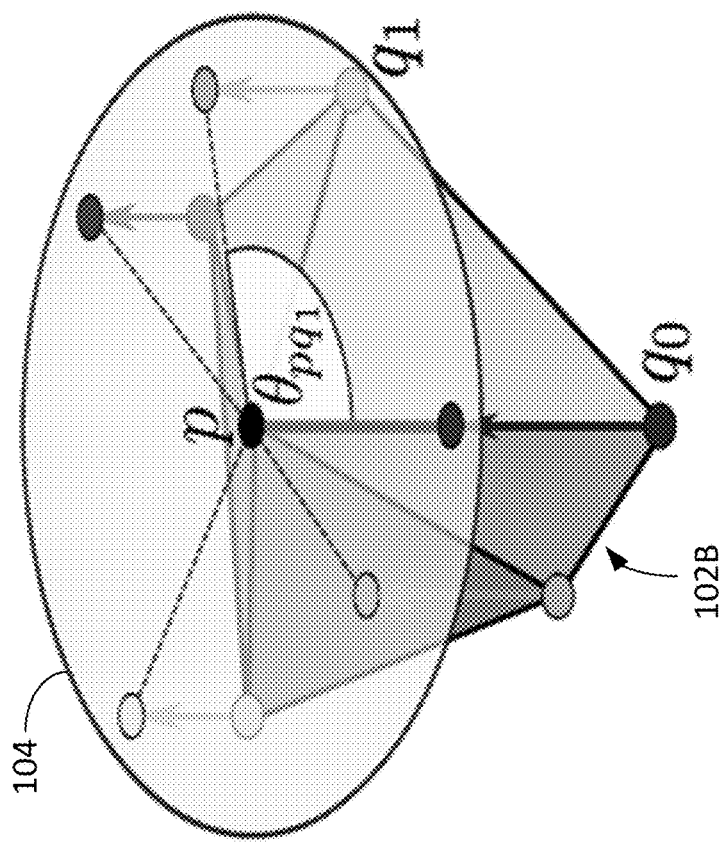
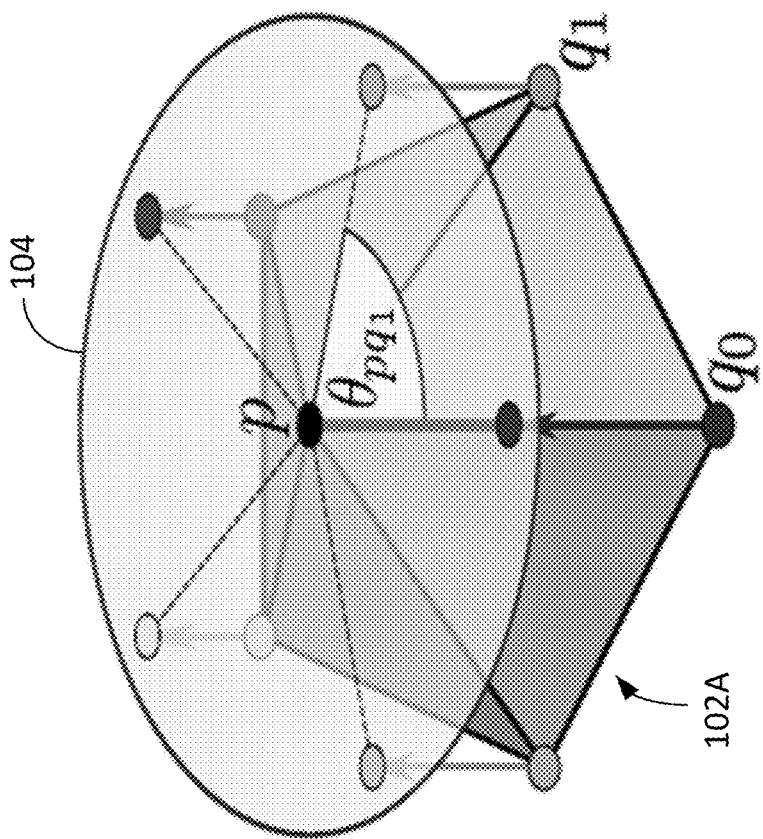
FIG. 1

Algorithm Gauge Equivariant Mesh CNN layer

Input: mesh $M$, input/output feature types $\rho_{in}$, $\rho_{out}$, reference neighbours $(q_0^p \in \mathcal{N}_p)_{p \in M}$.

Compute basis kernels $K_{self}^i$, $K_{neigh}^i(\theta)$.

Initialise weights $w_{self}^i$ and $w_{neigh}^i$.

For each neighbour pair, $p \in M$, $q \in \mathcal{N}_p$:
 compute neighbor angles $\theta_{pq}$ relative to reference neighbor
 compute parallel transporters $g_{q \to p}$

Forward(input features $(f_p)_{p \in M}$, weights $w_{self}^i$, $w_{neigh}^i$):

$$f_p' \leftarrow \sum_i w_{self}^i K_{self}^i f_p + \sum_{i, q \in \mathcal{N}_p} w_{neigh}^i K_{neigh}^i(\theta_{pq}) \rho_{in}(g_{q \to p}) f_q$$

*FIG. 4*

GAUGE EQUIVARIANT GEOMETRIC GRAPH CONVOLUTIONAL NEURAL NETWORK

CROSS-REFERENCE TO RELATED APPLICATIONS

This application claims the benefit of and priority to U.S. Provisional Patent Application No. 62/971,129, filed on Feb. 6, 2020, the entire contents of which are incorporated herein by reference.

INTRODUCTION

Aspects of the present disclosure relate to machine learning techniques, and in particular to systems and methods for performing machine learning using graph convolutional neural networks.

Convolutional neural networks (CNNs) have been established as the default method for many machine learning tasks, such as sound processing and image classification and segmentation. While being widely used, most applications of CNNs are restricted to specific geometries, like flat Euclidean spaces $\mathbb{R}^d$ or spheres $S^2$, where convolutions are easily defined and optimized implementations are available. The empirical success of CNNs on such spaces aroused the interest to generalize convolutions to more general spaces like Riemannian manifolds. However, since manifolds in general lack symmetries, a generalization of the convolution as a translation invariant, linear operator, is not presently possible.

One approach is to define a mesh as a discrete analog of two-dimensional embedded Riemannian manifold. Then, a convolution may be defined on the mesh to interpret it as a graph and apply a graph convolutional network (GCN). However, since conventional GCNs use isotropic filters, they are insensitive to the relative orientation of vertices and thus to the geometry of the mesh as a whole. Thus, information is lost and performance of the GCN suffers.

Accordingly, what are needed are techniques for performing information-preserving convolution operations on complex geometries, such as manifolds.

BRIEF SUMMARY

In a first aspect, a method for performing machine learning includes determining a plurality of vertices in a neighborhood associated with a mesh including a target vertex; determining a linear transformation configured to parallel transport signals along all edges in the mesh to the target vertex; applying the linear transformation to the plurality of vertices in the neighborhood to form a combined signal at the target vertex; determining a set of basis filters that maintain gauge equivariance for the respective mesh; linearly combining the basis filters using a set of learned parameters to form a gauge equivariant convolution filter, wherein the gauge equivariant convolution filter is constrained to maintain gauge equivariance; applying the gauge equivariant convolution filter to the combined signal to form an intermediate output; and applying a nonlinearity to the intermediate output to form a convolution output.

In a second aspect, a processing system includes a memory comprising computer-executable instructions and one or more processors configured to execute the computer-executable instructions and cause the processing system to perform a method for performing machine learning includes determining a plurality of vertices in a neighborhood associated with a mesh including a target vertex; determining a linear transformation configured to parallel transport signals along all edges in the mesh to the target vertex; applying the linear transformation to the plurality of vertices in the neighborhood to form a combined signal at the target vertex; determining a set of basis filters that maintain gauge equivariance for the respective mesh; linearly combining the basis filters using a set of learned parameters to form a gauge equivariant convolution filter, wherein the gauge equivariant convolution filter is constrained to maintain gauge equivariance; applying the gauge equivariant convolution filter to the combined signal to form an intermediate output; and applying a nonlinearity to the intermediate output to form a convolution output.

In a third aspect, a non-transitory computer-readable medium includes computer-executable instructions that, when executed by one or more processors of a processing system, cause the processing system to perform a method for performing machine learning includes determining a plurality of vertices in a neighborhood associated with a mesh including a target vertex; determining a linear transformation configured to parallel transport signals along all edges in the mesh to the target vertex; applying the linear transformation to the plurality of vertices in the neighborhood to form a combined signal at the target vertex; determining a set of basis filters that maintain gauge equivariance for the respective mesh; linearly combining the basis filters using a set of learned parameters to form a gauge equivariant convolution filter, wherein the gauge equivariant convolution filter is constrained to maintain gauge equivariance; applying the gauge equivariant convolution filter to the combined signal to form an intermediate output; and applying a nonlinearity to the intermediate output to form a convolution output.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 1 depicts how an isotropic filter would propagate the signal from the neighbors and their representation in the tangent planes.

FIG. 4 depicts an example algorithm for processing gauge equivariant convolutional neural network mesh layers.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 2:
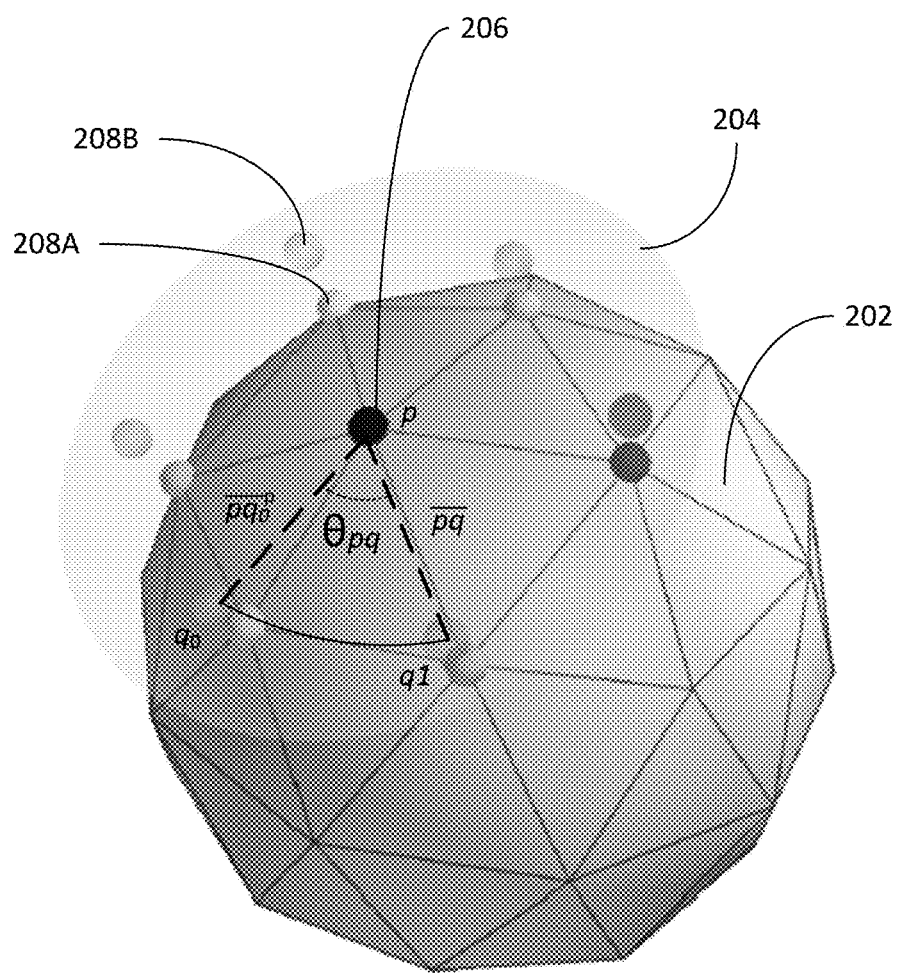
FIG. 2 depicts an example of encoding the local neighborhood geometry of a vertex on its tangent plane.

Aspects of the present disclosure provide apparatuses, methods, processing systems, and computer readable mediums for performing machine learning using gauge equivariant geometric graph convolutional neural networks.

Current methods for processing signals on manifolds are lacking in that they either ignore the geometry of the manifold or are very limited in their ability to learn arbitrary signal processing functions. In the former case, the signal is seen as defined on some graph, rather than on the manifold. By disregarding the geometry of the manifold, though, critical information is lost, which decreases the performance of the network. In the latter case, convolutions are defined on the manifold, but only a limited class of filters (or kernels) is considered for the convolution. Specifically, such networks only use filters that are isotropic, meaning they are the same in all directions and thus cannot detect any rotational variation in the signal. Isotropic filters also discard valuable information and harm performance of such networks.

Some anisotropic methods for performing convolutions on manifolds have been proposed, but these require picking a reference orientation (gauge) for the filter in some arbitrary, non-unique fashion. This requirement makes it impossible to construct networks that are invariant under, for example, rotations of the manifold, and often create discontinuities in how the convolution acts on the manifold, which harms performance of such networks.

Embodiments described herein, on the other hand, relate to gauge equivariant mesh convolutional neural networks (GEM-CNNs) configured to generalize graph convolutional networks (GCNs) in order to apply anisotropic, gauge equivariant filters (or kernels).

Generally, GEM-CNNs may be thought of as implementation of gauge equivariant CNNs on arbitrary 2-dimensional meshes. GEM-CNNs extract features by applying filters in geodesic polar coordinates and therefore respect the Riemannian metric. Further, the features extracted by GEM-CNNs are by design guaranteed to encode geometric quantities like scalars, vectors, tensors or more general objects that are endowed with a consistently defined notion of orientation or pose.

In order to describe a nontrivial geometric feature at some point of a mesh, such as its orientation or pose, it is necessary to express it relative to a choice of local reference frame (or gauge) at the corresponding location. Since any choice of gauge is equally valid, a networks' prediction should not depend on it, which is to say that the convolution operation as well as other layers should be equivariant to gauge transformations (i.e. changes of reference frames). Unlike other anisotropic methods, GEM-CNNs are equivariant to the choice of gauge for the filters. Thus, convolution using a GEM-CNN resembles a graph convolution, but the convolution is aware of the relative orientation of the vertices in a mesh representation of a manifold, thereby capturing more information. Because this orientation information is captured, rather than discarded as in conventional GCNs, the performance of GEM-CNNs is significantly improved as compared to conventional GCNs.

Further, because the features resulting from gauge equivariant filters used in GEM-CNNs carry orientation information, a geometric message passing scheme may be used to parallel transporting features over mesh edges. This information transport results in further improved expressivity over conventional GCNs and other methods.

Convolutions on Graphs with Geometry

Generally, a mesh is a set of vertices in $\mathbb{R}^3$ combined with a set of polygonal faces. Each polygonal face may be defined by a tuple of the vertices that are at the corner of the polygonal faces. Thus, discrete two-dimensional manifolds or meshes M may be described by a set V of vertices in $\mathbb{R}^3$ together with a set F of integer tuples, specifying vertices that form polygonal faces via their ids. For a mesh to describe a proper manifold (possibly with a boundary), each edge needs to be connected to two faces (or one face, when the edge is a boundary), and the neighborhood of each vertex needs to be homeomorphic to a disk (or part of a disk, if it is on a boundary). Signals may be represented as geometric quantities at each vertex of a mesh. For example, a signal at a vertex in the mesh can be represented by a vector in the tangent plane of the vertex.

The topology of a mesh M induces a graph G, whose nodes and edges correspond to the vertices and edges of the mesh. This allows for the application of graph convolutional neural networks (GCNs) for processing signals on meshes. However, the interpretation of a mesh as a graph discards important information of the mesh geometry. In particular, a graph does not encode an ordering or the relative orientation of the edges. Because of this property of graphs, the output of conventional GCNs at a node p is designed to be invariant to any permutation of its neighbors $q_i \in N(p)$. A graph convolution on a mesh therefore corresponds to applying an isotropic convolutional filter, i.e., a filter that produces the same value when measured from different directions. Since isotropic filters are insensitive to the orientation of patterns, their features are strictly less expressive than those of anisotropic, and therefore orientation aware, filters.

A conventional graph convolution on a graph G, evaluated at a vertex p can be defined by:

$$(K*f)_p = K_{self}f_p + \Sigma_{q \in N_p} K_{neigh}f_q, \qquad \text{(Eq. 1)}$$

where $K_{self} \in \mathbb{R}^{C_{in} \times C_{out}}$ and $K_{neigh} \in \mathbb{R}^{C_{in} \times C_{out}}$ are two linear maps which model a self-interaction and the neighbor contribution, respectively. Such defined graph convolutions do not distinguish between their neighbors, that is, each neighbor is transformed by the same matrix $K_{neigh}$. Signals from different directions can thus not be disambiguated, making the filter isotropic. To illustrate this point, FIG. 1 depicts how an isotropic filter would propagate the signal from the neighbors $q \in N_p$ and their representation in the tangent planes $T_pM$ 104 to p in exactly the same way in both neighborhoods 102A and 102B, even though the neighborhoods 102A and 102B are geometrically distinct. For example, as depicted, points $q_0$ and $q_1$ have moved positions between neighborhoods 102A and 102B FIG. 2 depicts an example of encoding the local neighborhood geometry of a vertex $p \in V$ (206) on its tangent plane $T_pM$ (204). To define the orientations $\theta_{pq}$ of neighboring vertices $q \in N(p)$ of p, the neighboring vertices are mapped to the tangent plane $T_pM$ at p.

In one embodiment, the distances and orientations of neighboring vertices $q_i \in N(p)$ (e.g., 208A) are captured by determining their Riemannian logarithm map $\log p(q_i) \in T_pM$ (e.g., 208B). Then an arbitrary reference neighbor $q_0^p$ is chosen to determine a reference orientation $\theta_{pq_0^p} := 0$. The angles $\theta_{pq}$ of other neighbors are defined as the angle between their edge $\overline{pq}$ and the reference edge $\overline{pq_0^p}$.

The tangent spaces $T_pM$ of vertices $p \in V$ can thus be determined by a normal vector which is defined as the average of the adjacent face normals. Note that the Riemannian logarithm map 204 in FIG. 2 preserves distances and is injective for sufficiently small neighborhoods, meaning different points on the mesh within a threshold distance top are mapped to different points on the tangent plane.

Feature Vector Fields and Gauge Equivariance

In conventional neural networks, including GCNs used on meshes, the features on the vertices of the mesh are invariant to choices of gauge. However, it is impossible to construct an anisotropic gauge equivariant CNN using only gauge invariant features. Accordingly, features that transform under a change of gauge may be defined.

For example, a frame may be defined $w_p$ at $p \in V$ by picking a neighbor $q \in N_p$ of p. The tangent vector unit vector $\log_p(q)/\|\log_p(q)\| \in T_p M$ pointing from p towards q defines one basis vector of $T_p M$, and the other basis vector is uniquely defined in an orientable manifold to create an orthonormal frame. The frame can be seen as a map $w_p$: $\mathbb{R}^2 \to T_p M$, mapping vector coefficients to tangent vectors.

A different choice of neighbor corresponds to a frame that is related to the former frame by a planar rotation $g_p \in SO(2)$, so that $w'_p = w_p \circ g_p$. In other words, the two gauges are related by the gauge transformations $(g_p)_{p \in V}$ at all vertices. Here, SO(2) is a collection (or group) of orthogonal 2×2 matrices with determinant 1 that perform rotations, where the elements of SO(2) are uniquely specified by an angle $[0, 2\pi)$. Thus, a point on a plane transformed with an element of SO(2) rotates around the 0 point.

Now let $V_p \cong \mathbb{R}^C$ be a general feature vector space at vertex p and $V = \bigoplus_{p \in V} V_p$ be the direct sum of the vector spaces of the vertices. Then $f \in V$ means $f = (f_p)_{p \in V}$, with $f_p \in V_p$.

Different types of feature fields are distinguished by the transformation law of their coefficients under gauge transformations. Specifically, a C-dimensional geometric feature is of type $\rho$ if its coefficients $f_p \in V_p$ transform by gauge transformation $g_p$ under the group representation $\rho: SO(2) \to GL(C, \mathbb{R})$ according to $f_p \mapsto \rho(g_p^{-1}) f_p$. Similarly, the action of a gauge transformation can be defined as $g = (g_p)_{p \in V}$ for the combined feature vector $f_p \mapsto (\rho(g_p^{-1}) f_p)_{p \in V}$. The group representation thereby instantiates a linear action of the gauge group on the space of feature coefficients. Specific examples are scalar and tangent vector fields with the trivial representation $\rho(g_p) = 1$ and the standard representation $\rho(g_p) = g_p$, respectively, since they transform as given by $s \mapsto 1 \cdot s$ and $v \mapsto g_p^{-1} v$.

Between two feature vector spaces V and V' of type $\rho$ and $\rho'$, a map $\Phi: V \to V'$ is gauge equivariant if a gauge transformation applied to the input results in a gauge transformation applied to the output. If so, then the following commutes for all $g_p \in SO(2)$:

$$\begin{array}{ccc} V & \xrightarrow{\Phi} & V' \\ \rho(g) \downarrow & & \downarrow \rho'(g) \\ V & \xrightarrow{\Phi} & V' \end{array}$$

Parallel Transport of Features Along Meshes

Similar to graph convolutions, gauge equivariant mesh convolutions compute new feature vectors at vertices $p \in V$ by linearly accumulating feature vectors from their neighboring vertices $q_i \in N(p)$. Since feature signals can be geometric quantities, the convolution evaluated at p, needs to move signals from neighbor q to vertex p, before applying the filter.

On flat geometries, like planar meshes, the feature vector spaces $V_p$ and $V_q$ are canonically related to each other. A summation $f_p + f_q$ of feature vectors $f_p \in V_p$ and $f_q \in V_q$ can thus be performed without further considerations.

However, on general meshes and other nontrivial geometries, the relation between the vector spaces $V_p$ and $V_q$ is ambiguous such that the summation of feature vectors in different spaces $V_p$ and $V_q$ is not well-defined. A solution to this problem is to parallel transport the feature vectors from $V_q$ along the edge from q to p to $V_p$. The transported vector can then be summed to feature vectors at p. This parallel transport is done by applying a matrix $\rho(g_{q \to p}) \in \mathbb{R}^{C_{out} \times C_{in}}$ to the feature q. The transporter depends on the geometric type of the feature, denoted by $\rho$.

Parallel transport can thus be thought of as moving a vector along an edge without rotating it. The resulting abstract vector is then parallel to the original vector in the usual sense on flat spaces. However, if the transported source frame at q disagrees with the target frame at p, the coefficients of the transported vector have to be transformed to the target coordinates. This coordinate transformation defines the transporter $g_{q \to p}$.

On general meshes, the fact that the tangent spaces $T_q M \subset \mathbb{R}^3$ and $T_p M \subset \mathbb{R}^3$ are usually not parallel in the ambient space $\mathbb{R}^3$ also needs to be accounted for. The parallel transport therefore includes the additional step of first aligning the tangent space at q to be parallel to that at p, before translating a vector between them. In particular, given the normals $n_q$ and $n_p$ of the source and target tangent spaces $T_q M$ and $T_p M$, the vector space is being aligned by rotating it by an angle $\alpha = \arccos(n_q^T n_p)$ around the axis $n_q \times n_p$ in the ambient space. The rotated source frame may be denoted by $(Re_{q,1}, Re_{q,2})$ and the target frame by $(e_{p,1}, e_{p,2})$. The angle to account for the parallel transport between the two frames is then found by determining:

$$\theta_{q \to p} = \mathrm{atan}\, 2((Re_{q,2})^T e_{p,1}, (Re_{q,1})^T e_{p,1}) \qquad \text{(Eq. 2)}$$

The discrete Levi-Civita connection on mesh edges is then given by the corresponding SO(2) group elements $g_{q \to p}$. Note that these connections can be precomputed before training a model because the mesh is fixed for the purposes of the convolution.

Under gauge transformations $w_p \mapsto w_p g_p$ and $w_q \mapsto w_q g_q$ the parallel transporters transform according to:

$$g_{q \to p} \mapsto g_p^{-1} g_{q \to p} g_q \qquad \text{(Eq. 3)}$$

Thus, this transformation means that a transporter in a transformed gauge is given by a gauge transformation back to the original gauge via $g_q$ followed by the original transport by $g_{q \to p}$ and a transformation back to the new gauge via $g_p^{-1}$.

Figure 3A:
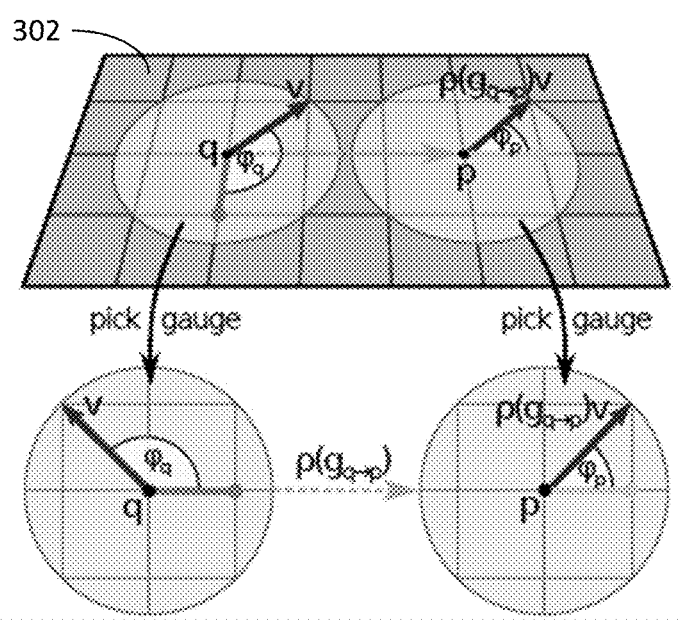
FIGS. 3A and 3B depict examples of parallel transport of a feature vectors along meshes to yield transported vectors.
Figure 3B:
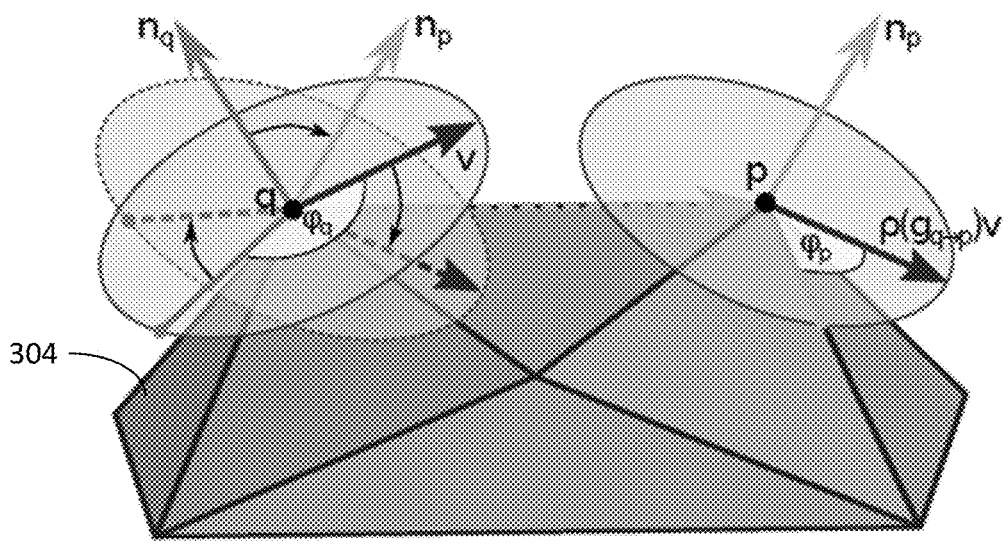

FIGS. 3A and 3B depict examples of parallel transport of tangent vectors $v \in T_q M$ at q to $R(q_{q \to p}) v \in T_p M$ at p on meshes.

In particular, FIG. 3A depicts an example of parallel transport of feature vector v of type $\rho$ at vertex q to vertex p along a flat mesh 302 yielding vector $\rho(g_{q \to p}) v$. On the flat mesh 302, parallel transport moves a vector over the surface such that it stays parallel in the usual sense on flat spaces. The parallel transporter $g_{q \to p} = \varphi_p - \varphi_q$ corrects the transported vector coefficients for different choices of gauges at q and p.

When transporting along an edge of a general mesh, the tangent spaces at q and p might not be aligned. Before correcting for the relative frame orientation via $g_{q \to p}$, the tangent space $T_q M$, and thus $v \in T_q M$, is rotated by an angle $\alpha$ around $n_q \times n_p$ such that its normal $n_q$ coincides with that of $n_p$. FIG. 3B depicts an example of parallel transport of feature vector v of type p at vertex q to vertex p along an edge of a general mesh 304 yielding vector $p(g_{q \to p})v$.

Gauge Equivariant Mesh Convolution

In order to overcome the shortcomings of isotropic filters in traditional graph convolutions on meshes, embodiments described herein utilize gauge equivariant mesh convolutions that modify graph CNNs on meshes such that they are able to use anisotropic filters (or kernels) $K(\theta)$ whose value depends on an orientation $\theta \in [0, 2\pi)$ while still respecting the local geometry.

A geometry aware graph convolution may generally be defined on mesh M by applying anisotropic convolution filters on the tangent spaces where each vertex p on the mesh M has its own tangent plane. The vertices q sufficiently close to p (e.g., within a threshold distance to p) are mapped to the tangent plane associated with vertex p, such as depicted in FIG. 2. The convolution then takes place on these tangent planes resulting on one output value per tangent plane for the vertices.

In order to share parameters (e.g., weights) between different points on the mesh, which may include points on the vertices, edges, and faces of the mesh, a single filter on the plane $\mathbb{R}^2$ may be used, which is then being mapped to all tangent spaces $T_pM$. Where signals on a mesh are only associated with vertices, the points may be a subset of all possible points only associated with the vertices. Contrary to the case of, for example, planar images, the tangent spaces of general meshes have no preferred orientation such that the filter alignment must be chosen arbitrarily. Without additional constraints, the output of such a network would therefore depend on the choice of filter orientation in an unpredictable fashion.

A choice of filter orientation at p is mathematically formalized by a choice of gauge or reference frame of $T_pM$. The arbitrariness of such a choice is resolved in a principled way by constraining the convolution filter to be equivariant under gauge transformations. As explained further below, the gauge equivariance of the convolution filter ensures that the filter responses in different orientations are related by a pre-specified transformation law. Their information content is therefore guaranteed to be equivalent for any chosen gauge.

A gauge equivariant mesh convolutions may be defined as:

$$(K * f)_p = K_{self} f_p + \Sigma_{q \in N_p} K_{neigh}(\theta_{pq}) \rho(g_{q \to p}) f_q \quad \text{(Eq. 4)}$$

Eq. 4 differs from the conventional graph convolution, defined in Eq. 1, by the use of an anisotropic filter and the parallel transport message passing.

In order for the mesh convolution of Eq. 4 to be equivariant, the outcome of the convolution needs to be equivalent for any choice of reference orientation. This is not the case for any anisotropic filter, but only for such filters that are equivariant under changes of reference orientations (gauge transformations), which imposes a linear constraint on the filters. A set of basis filters $K_{self}^i$ and $K_{neigh}^i$ can be determined and linearly combined with weights $w_{self}^i$ and $W_{neigh}^i$ such that $K_{self} = \Sigma_i w_{self}^i K_{self}^i$ and $K_{neigh} = \Sigma_i w_{neigh}^i K_{neigh}^i$.

FIG. 4 depicts an example 400 of an algorithm for initialization and forward pass of a GEM-CNN layer. The step for computing basis kernels $K_{self}^i$ and $K_{neigh}^i(\theta)$ is described in detail below with respect to FIGS. 5A and 5B. Computing neighbor angles and parallel transporters $g_{q \to p}$ was explained above in reference to FIGS. 3A and 3B. Algorithm 400 thus enables gradients to be computed by automatic differentiation.

Figure 5B:
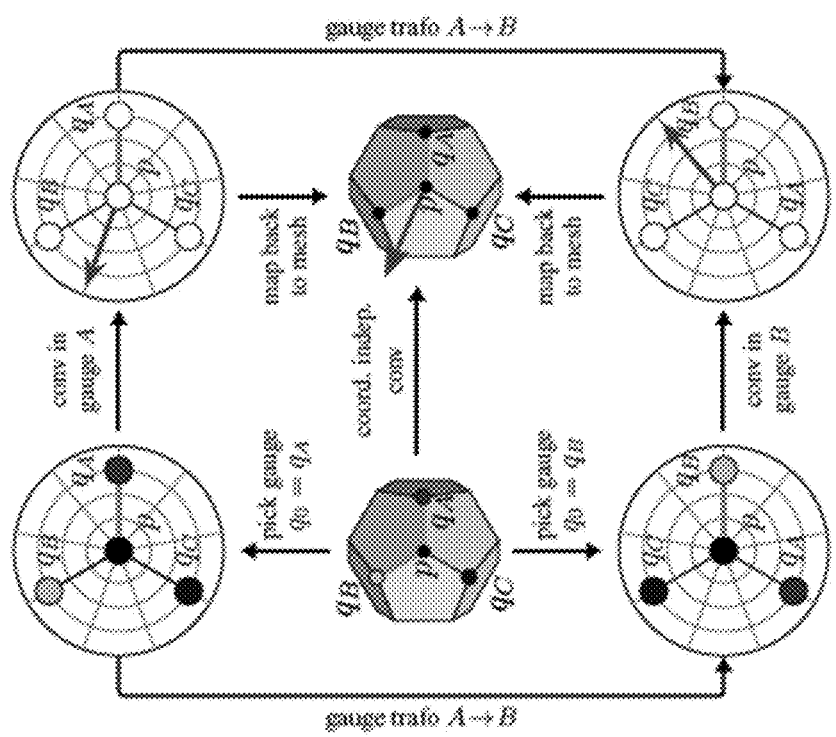
FIGS. 5A and 5B depict example gauge equivariant mesh convolutions.
Figure 5A:
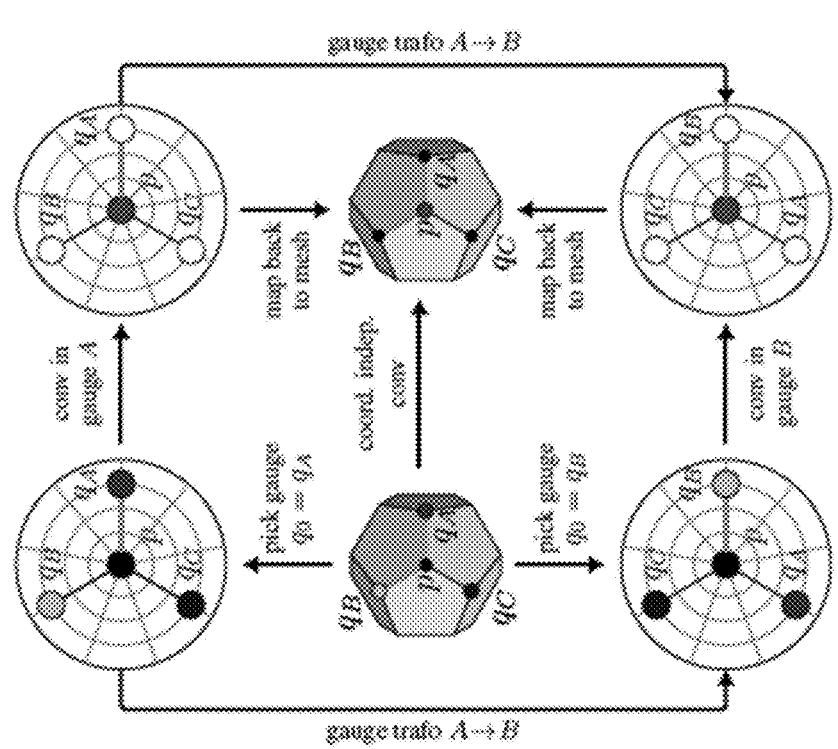

FIGS. 5A and 5B depict a visualization of gauge equivariant mesh convolution in two configurations: scalar to scalar (FIG. 5A) and scalar to vector (FIG. 5B). The convolution operates in a gauge, so that vectors are expressed in coefficients in a basis and neighbors have polar coordinates, but can also be seen as a geometric convolution with a gauge-independent map from an input signal on the mesh to an output signal on the mesh. The convolution is equivariant if this geometric convolution does not depend on the intermediate chosen gauge, in which case the diagram commutes.

Considering the left hand side of FIG. 5A, given a neighborhood of vertex p, each neighbor q may be expressed in terms of its polar coordinates $(r_q; \theta_q)$ on the tangent plane, so that the filter value at that neighbor $K_{neigh}(\theta_q)$ is well-defined. This requires choosing a basis on the tangent plane. In one embodiment, the basis may be determined by picking a neighbor as reference neighbor (denoted $q_0$), which has the zero angle $\theta_{q0} = 0$. In the top path, $q_A$ is chosen as the reference neighbor, which can thus be referred to as gauge A, in which neighbors have angles $\theta_q^A$. In the bottom path, neighbor $q_B$ is chosen as reference point and can be referred to as gauge B. There are different bases for the tangent plane and different angles $\theta_q^B$ for each neighbor. Comparing the two gauges, it can be seen that they are related by a rotation, so that $\theta_q^B = \theta_q^A - \theta_{qB}^A$. This change of gauge is called a gauge transformation of angle $g := \theta_{qB}^A$, in other words, g is defined to be equal to $\theta_{qB}^A$.

Thus, FIG. 5A illustrates a gauge equivariant convolution that takes input and output features, such as gray scale image values or temperatures on the mesh, which are called scalar features. The top path represents the convolution in gauge A, the bottom path in convolution B. In either case, the convolution can be interpreted as consisting of three steps.

First, for each vertex p, the value of the scalar features on the mesh at each neighboring vertex q, represented by colors, is mapped to the tangent plane at p at angle $\theta_q$ defined by the gauge. Second, the convolutional kernel sums for each neighbor q, the product of the feature at q and filter $K(\theta_q)$. Third, the output is mapped back to the mesh. These three steps can be composed into a single step, which can be referred to as a geometric convolution, mapping from input features on the mesh to output features on the mesh. The convolution is gauge equivariant if this geometric convolution does not depend on the gauge picked in the interim. In this case, however, the convolution output needs to be the same in both gauges, for the convolution to be equivariant. Hence, $K(\theta_q) = K(\theta_q - g)$ as the orientations of the neighbors differ by some angle g, and the kernel must be isotropic.

Because the desire is for an anisotropic convolution, the output feature of the convolution at p can, instead of a scalar, be two numbers $v \in \mathbb{R}^2$, which can be interpreted as coefficients of a tangent feature vector in the tangent space at p, as visualized in FIG. 5B. As shown on the right hand side, different gauges induce a different basis of the tangent plane, so that the same tangent vector (shown on the right on the mesh), is represented in different coefficients in the gauge. This gauge equivariant convolution must be anisotropic because going from the top row to the bottom row, if the orientations of the neighbors is changed by −g, the coefficients of the output vector $v \in \mathbb{R}^2$ of the filter must be also rotated by −g. This is written as R(−g)v, where $R(-g) \in \mathbb{R}^{2 \times 2}$ is the matrix that rotates by angle −g.

Filter Constraints for Mesh Convolution Equivariance

Given an input type $\rho_{in}$ and output type $\rho_{out}$ of dimensions $C_{in}$ and $C_{out}$, the filters for a gauge equivariant mesh convolution are $K_{self} \in \mathbb{R}^{C_{out} \times C_{out}}$ and $K_{neigh}:[0,2\pi) \in \mathbb{R}^{C_{out} \times C_{in}}$. However, not all such filters are equivariant. In the examples depicted in FIGS. 5A and 5B, mapping from a scalar to a scalar gets get that $K_{neigh}(\theta-g)=K_{neigh}(\theta)$ for all angles $\theta$, $g$ and the convolution is isotropic. If mapping from a scalar to a vector, rotating the angles $\theta_q$ results in the same tangent vector as rotating the output vector coefficients, so that $K_{neigh}(\theta-g)=R(-g)K_{neigh}(\theta)$.

In general, gauge equivariant filters must satisfy for any gauge transformation $g \in [0,2\pi)$ and $\theta \in [0,2\pi)$, such that $K_{neigh}(\theta-g)=\rho_{out}(-g)K_{neigh}(\theta)\rho_{in}(g)$ and $K_{self}=\rho_{out}(-g)K_{self}\rho_{in}(g)$. Thus, a filter can be seen as consisting of multiple blocks, where each block takes as input one irreducible representation and outputs one irreducible representation, and the filters $K_{neigh}(\theta)$ and $K_{self}$ map from irreducible representation $\rho_n$ to irreducible representation $\rho_m$ as a linear combination of the basis kernels as in Table 1, below. Further, all basis kernels of all pairs of input irreducible representations and output irreducible representations can be linearly combined to form an arbitrary equivariant kernel from feature of type $\rho_{in}$ to $\rho_{out}$.

Types of Geometric Features for Gauge Equivariant Mesh CNNs

Vectors and scalars are not the only type of geometric features that can be inputs and outputs of a GEM-CNN layer. In general, the coefficients of a geometric feature of C dimensions changes by a linear transformation $\rho(-g) \in \mathbb{R}^{C \times C}$ if the gauge is rotated by angle g. The map $\rho:[0,2\pi) \to \mathbb{R}^{C \times C}$ is called the type of the geometric quantity and is formally known as a group representation of the planar rotation group SO(2). From the theory of group representations, any feature type can be composed from irreducible representations. In this case, these are the one dimensional invariant scalar representation and for all $n \in \mathbb{N}_{\geq 0}$ a two-dimensional representation, which transforms as:

$$\rho_0(g) = 1, \rho_n(g) = \begin{pmatrix} \cos ng & -\sin ng \\ \sin ng & \cos ng \end{pmatrix}$$

Scalars and tangent vector features correspond to $\rho_0$ and $\rho_1$, respectively.

The type of the feature at each layer in the network can thus be fully specified (up to a change of basis) by the number of copies of each irreducible representations. Similar to the dimensionality in a conventional CNN, the choice of type is a hyperparameter that can be freely chosen to optimize performance. The following matrix is one example of a feature type:

$$\rho(g) = \begin{pmatrix} 1 & & & & \\ & \cos g & -\sin g & & \\ & \sin g & \cos g & & \\ & & & \cos g & -\sin g \\ & & & \sin g & \cos g \end{pmatrix}$$

In one embodiment, parallel transport along the edges of a mesh can be determined by the discrete Levi-Civita connection corresponding to the metric induced by the ambient space $\mathbb{R}^3$. This connection is given by parallel transporters $g_{q \to p} \in SO(2)$ on the mesh edges, which maps tangent vectors $v_g \in T_q M$ at q to tangent vectors $g_{q \to p} v_g \in T_p M$ at p. Feature vectors $f_q \in V_q$ of type p are similarly transported to $\rho(g_{q \to p}) f_q \in V_p$ by applying the corresponding feature vector transporter $\rho(g_{q \to p})$.

Approximately Gauge Equivariant Nonlinearity

For a neural network to be gauge equivariant, every layer should be gauge equivariant, including non-linear activation functions (e.g., nonlinearities).

Irreducible representation features do not commute with pointwise nonlinearities. However, a basis transformation can be performed to a basis in which pointwise nonlinearities are approximately gauge equivariant. Afterwards, the basis may be transformed back to the irreducible representation.

For simplicity, it can be assumed that a representation is U copies of $\rho_0 \oplus \rho_1 \oplus \ldots \rho_B$. One such copy can be treated as the discrete Fourier modes of a circular signal with band limit B. An inverse Discrete Fourier Transform (DFT) matrix can map these modes to N spatial samples. Under a gauge transformation of a multiple of $2\pi/N$, the samples are cyclically shifted. The resulting representation can thus be called a regular representation.

Nonlinearities that act pointwise on these N samples, such as ReLU, commute with such gauge transformations. The procedure is however only approximately gauge equivariant under gauge transformations of angles that are not multiples of $2\pi/N$ Nevertheless, the following may be derived as solutions to the angular filter constraint for filters that map from $\rho_n$ to $\rho_m$ where $c_\pm = \cos(m \pm n)\theta$ and $s_\pm = \sin(m \pm n)\theta$:

TABLE 1

| $\rho_{in} \to \rho_{out}$ | Linearly independent solutions for $K_{neigh}(\theta)$ |
|---|---|
| $\rho_0 \to \rho_0$ | 1 |
| $\rho_n \to \rho_0$ | $(\cos n\theta\ \sin n\theta), (\sin n\theta\ -\cos n\theta)$ |
| $\rho_0 \to \rho_m$ | $\begin{pmatrix} \cos m\theta \\ \sin m\theta \end{pmatrix}, \begin{pmatrix} \sin m\theta \\ -\cos m\theta \end{pmatrix}$ |
| $\rho_n \to \rho_m$ | $\begin{pmatrix} c_- & -s_- \\ s_- & c_- \end{pmatrix}, \begin{pmatrix} s_- & c_- \\ -c_- & s_- \end{pmatrix}, \begin{pmatrix} c_+ & s_+ \\ s_+ & -c_+ \end{pmatrix}, \begin{pmatrix} -s_+ & c_+ \\ c_+ & s_+ \end{pmatrix}$ |
| $\rho_{in} \to \rho_{out}$ | Linearly independent solutions for $K_{self}(\theta)$ |
| $\rho_0 \to \rho_0$ | (1) |
| $\rho_n \to \rho_n$ | $\begin{pmatrix} 1 & 0 \\ 0 & 1 \end{pmatrix}, \begin{pmatrix} 0 & 1 \\ -1 & 0 \end{pmatrix}$ |

Further, it can be shown that in the limit $N \to \infty$, exact equivariance is restored and a finite error bound is provided, which can help selecting N.

Figure 6:
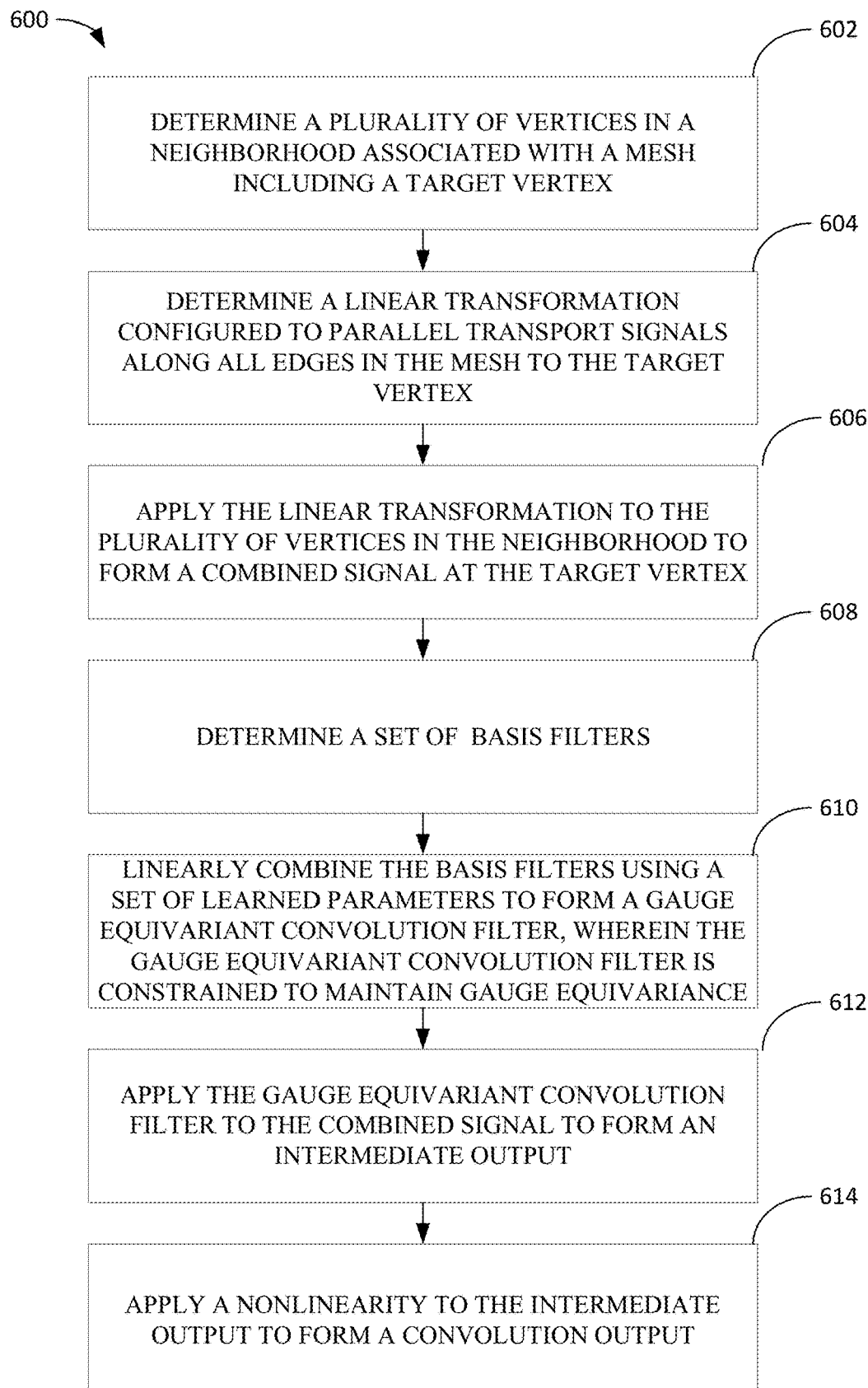
FIG. 6 depicts an example method for performing machine learning using a gauge equivariant geometric graph convolutional neural network.

Example Method for Performing Machine Learning Using a Gauge Equivariant Geometric Graph Convolutional Neural Network FIG. 6 depicts an example method 600 for performing machine learning using a gauge equivariant geometric graph convolutional neural network.

Method 600 begins at step 602 with determining a plurality of vertices in a neighborhood associated with a mesh including a target vertex.

Method 600 then proceeds to step 604 with determining a linear transformation configured to parallel transport signals along all edges in the mesh to the target vertex.

In some embodiments, determining the linear transformation configured to parallel transport signals along the plurality of vertices in the mesh to the target vertex further comprises aligning a tangent space at each respective vertex in the plurality of vertices, other than the target vertex, to be parallel to a tangent space of the target vertex before translating a vector between the respective vertex and the target vertex.

Method 600 then proceeds to step 606 with applying the linear transformation to the plurality of vertices in the neighborhood to form a combined signal at the target vertex.

Method 600 then proceeds to step 608 with determining a set of basis filters. As described above, the set of basis filter may be configured to maintain gauge equivariance for the respective mesh.

Method 600 then proceeds to step 610 with linearly combining the basis filters using a set of learned parameters to form a gauge equivariant convolution filter, wherein the gauge equivariant convolution filter is constrained to maintain gauge equivariance. In some embodiments, the gauge equivariant convolution filter is anisotropic.

Method 600 then proceeds to step 612 with applying the gauge equivariant convolution filter to the combined signal to form an intermediate output.

Method 600 then proceeds to step 614 with applying a nonlinearity to the intermediate output to form a convolution output. In some embodiments the nonlinearity is gauge equivariant.

In some embodiments, method 600 further comprises providing the convolution output to another layer of a gauge equivariant geometric graph convolutional neural network.

In some embodiments, method 600 further comprises determining a non-uniform discrete Fourier transform matrix for the neighborhood; and generating the gauge equivariant convolution filter for the neighborhood based on the non-uniform discrete Fourier transform matrix.

In some embodiments, method 600 further comprises transforming the combined signal to a regular representation with a plurality of representation samples, wherein each representation sample in the plurality of representation samples is rotated with respect to each other representation sample in the plurality of representation samples; and for each respective representation sample in the plurality of representation samples: rotating the gauge equivariant convolution filter according to the rotation of the respective representation sample; and applying the rotated nonlinearity to the respective representation sample.

In some embodiments, method 600 further comprises encoding the local geometry of each respective vertex in the plurality of vertices in the neighborhood by mapping the respective vertex via a discrete equivalent of a Riemannian logarithm map in a tangent plane.

Figure 7:
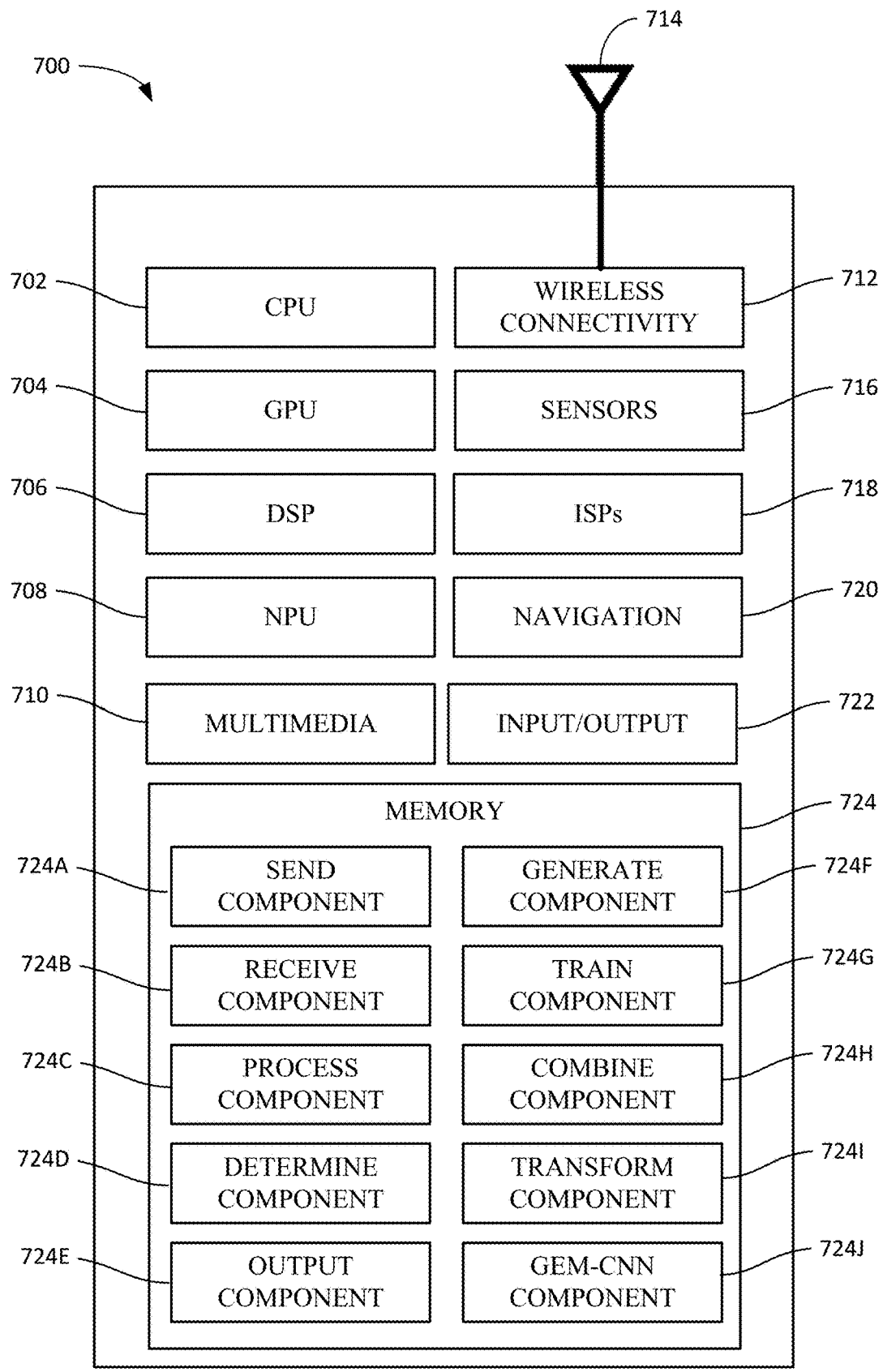
FIG. 7 depicts an example electronic device that may be configured to perform machine learning using gauge equivariant geometric graph convolutional neural networks.

Example Electronic Device for Performing Machine Learning Using a Gauge Equivariant Geometric Graph Convolutional Neural Network FIG. 7 depicts an example electronic device 700 that may be configured to machine learning using gauge equivariant geometric graph convolutional neural networks, as described herein for example with respect to FIG. 6.

Electronic device 700 includes a central processing unit (CPU) 702, which in some examples may be a multi-core CPU. Instructions executed at the CPU 702 may be loaded, for example, from a program memory associated with the CPU 702 or may be loaded from a memory partition 724.

Electronic device 700 also includes additional processing components tailored to specific functions, such as a graphics processing unit (GPU) 704, a digital signal processor (DSP) 706, a neural processing unit (NPU) 708, a multimedia processing unit 710, and a wireless connectivity component 712.

An NPU, such as 708, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 708, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized training or inference, or in some cases configured to balance performance between both. For NPUs that are capable of performing both training and inference, the two tasks may still generally be performed independently.

NPUs designed to accelerate training are generally configured to accelerate the curating of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference and generally configured to operate on complete models. Such NPUs may thus be configured to input a new piece of data and rapidly process it through an already trained model to generate a model output (e.g., an inference).

In one implementation, NPU 708 is a part of one or more of CPU 702, GPU 704, and/or DSP 706.

In some examples, wireless connectivity component 712 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 712 is further connected to one or more antennas 714.

Electronic device 700 may also include one or more sensor processing units 716 associated with any manner of sensor, one or more image signal processors (ISPs) 718 associated with any manner of image sensor, and/or a navigation processor 720, which may include satellite-based positioning system components (e.g., GPS or GLONASS) as well as inertial positioning system components.

Electronic device 700 may also include one or more input and/or output devices 722, such as screens, touch-sensitive surfaces (including touch-sensitive displays), physical buttons, speakers, microphones, and the like.

In some examples, one or more of the processors of electronic device 700 may be based on an ARM or RISC-V instruction set.

Electronic device 700 also includes memory 724, which is representative of one or more static and/or dynamic memories, such as a dynamic random access memory, a flash-based static memory, and the like. In this example, memory 724 includes computer-executable components, which may be executed by one or more of the aforementioned processors of electronic device 700.

In particular, in this example, memory 724 includes send component 724A, receive component 724B, process component 724C, determine component 724D, output component 724E, generate component 724F, train component 724G, combine component 724H, transform component 724I, and GEM-CNN component 724J. The depicted components, and others not depicted, may be configured to perform various aspects of the methods described herein.

Generally, electronic device 700 and/or components thereof may be configured to perform the methods described herein.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    determining a plurality of vertices in a neighborhood associated with a mesh including a target vertex, the plurality of vertices being associated with a set of input features input into a convolutional layer of a neural network;
    determining a linear transformation configured to parallel transport signals along all edges in the mesh to the target vertex;
    applying the linear transformation to the plurality of vertices in the neighborhood to form a combined signal at the target vertex;
    determining a set of basis filters configured to maintain gauge equivariance for each respective mesh corresponding to a respective representation sample;
    linearly combining the basis filters using a set of learned parameters to form a gauge equivariant convolution filter, wherein the gauge equivariant convolution filter is constrained to maintain gauge equivariance;
    transforming the combined signal to a regular representation with a plurality of representation samples, wherein each representation sample in the plurality of representation samples is rotated with respect to each other representation sample in the plurality of representation samples;
    for each respective representation sample in the plurality of representation samples:
        rotating the gauge equivariant convolution filter according to the rotation of the respective representation sample, and applying the rotated gauge equivariant convolution filter to the respective representation sample;
applying the gauge equivariant convolution filter to the combined signal to form an intermediate output;
applying a gauge equivariant nonlinearity to the intermediate output to form a convolution output; and
generating, using the neural network, an inference, based on the convolution output.

2. The method of claim 1, further comprising:
determining a non-uniform discrete Fourier transform matrix for the neighborhood; and
generating the gauge equivariant convolution filter for the neighborhood based on the non-uniform discrete Fourier transform matrix.

3. The method of claim 1, further comprising encoding a local geometry of each respective vertex in the plurality of vertices in the neighborhood by mapping the respective vertex via a discrete equivalent of a Riemannian logarithm map in a tangent plane.

4. The method of claim 1, wherein determining the linear transformation configured to parallel transport signals along the plurality of vertices in the mesh to the target vertex comprises aligning a tangent space at each respective vertex in the plurality of vertices, other than the target vertex, to be parallel to a tangent space of the target vertex before translating a vector between the respective vertex and the target vertex.

5. The method of claim 1, wherein the gauge equivariant convolution filter is anisotropic.

6. The method of claim 1, further comprising providing the convolution output to another layer of a gauge equivariant geometric graph convolutional neural network.

7. A processing system, comprising:
at least one memory comprising computer-executable instructions; and
one or more processors configured to execute the computer-executable instructions and cause the processing system to:
determine a plurality of vertices in a neighborhood associated with a mesh including a target vertex, the plurality of vertices being associated with a set of input features input into a convolutional layer of a neural network;
determine a linear transformation configured to parallel transport signals along all edges in the mesh to the target vertex;
apply the linear transformation to the plurality of vertices in the neighborhood to form a combined signal at the target vertex;
determine a set of basis filters configured to maintain gauge equivariance for each respective mesh corresponding to a respective representation sample;
linearly combine the basis filters using a set of learned parameters to form a gauge equivariant convolution filter, wherein the gauge equivariant convolution filter is constrained to maintain gauge equivariance;
transform the combined signal to a regular representation with a plurality of representation samples, wherein each representation sample in the plurality of representation samples is rotated with respect to each other representation sample in the plurality of representation samples;
for each respective representation sample in the plurality of representation samples:
rotate the gauge equivariant convolution filter according to the rotation of the respective representation sample, and
apply the rotated gauge equivariant convolution filter to the respective representation sample;
apply the gauge equivariant convolution filter to the combined signal to form an intermediate output;
apply a gauge equivariant nonlinearity to the intermediate output to form a convolution output; and
generate, using the neural network, an inference, based on the convolution output.

8. The processing system of claim 7, wherein the one or more processors are further configured to cause the processing system to:
determine a non-uniform discrete Fourier transform matrix for the neighborhood; and
generate the gauge equivariant convolution filter for the neighborhood based on the non-uniform discrete Fourier transform matrix.

9. The processing system of claim 7, wherein the one or more processors are further configured to cause the processing system to encode a local geometry of each respective vertex in the plurality of vertices in the neighborhood by mapping the respective vertex via a discrete equivalent of a Riemannian logarithm map in a tangent plane.

10. The processing system of claim 7, wherein in order to determine the linear transformation configured to parallel transport signals along the plurality of vertices in the mesh to the target vertex, the one or more processors are further configured to cause the processing system to align a tangent space at each respective vertex in the plurality of vertices, other than the target vertex, to be parallel to a tangent space of the target vertex before translating a vector between the respective vertex and the target vertex.

11. The processing system of claim 7, wherein the gauge equivariant convolution filter is anisotropic.

12. The processing system of claim 7, wherein the one or more processors are further configured to cause the processing system to provide the convolution output to another layer of a gauge equivariant geometric graph convolutional neural network.

13. A non-transitory computer-readable medium comprising computer-executable instructions that, when executed by one or more processors of a processing system, cause the processing system to perform a method, the method comprising:
determining a plurality of vertices in a neighborhood associated with a mesh including a target vertex, the plurality of vertices being associated with a set of input features input into a convolutional layer of a neural network;
determining a linear transformation configured to parallel transport signals along all edges in the mesh to the target vertex;
applying the linear transformation to the plurality of vertices in the neighborhood to form a combined signal at the target vertex;
determining a set of basis filters configured to maintain gauge equivariance for each respective mesh corresponding to a respective representation sample;
linearly combining the basis filters using a set of learned parameters to form a gauge equivariant convolution filter, wherein the gauge equivariant convolution filter is constrained to maintain gauge equivariance;
transforming the combined signal to a regular representation with a plurality of representation samples, wherein each representation sample in the plurality of representation samples is rotated with respect to each other representation sample in the plurality of representation samples;

for each respective representation sample in the plurality of representation samples:
  rotating the gauge equivariant convolution filter according to the rotation of the respective representation sample, and
  applying the rotated gauge equivariant convolution filter to the respective representation sample;
applying the gauge equivariant convolution filter to the combined signal to form an intermediate output;
applying a gauge equivariant nonlinearity to the intermediate output to form a convolution output; and
generating, using the neural network, an inference, based on the convolution output.

14. The non-transitory computer-readable medium of claim 13, wherein the method further comprises:
  determining a non-uniform discrete Fourier transform matrix for the neighborhood; and
  generating the gauge equivariant convolution filter for the neighborhood based on the non-uniform discrete Fourier transform matrix.

15. The non-transitory computer-readable medium of claim 13, wherein the method further comprises encoding a local geometry of each respective vertex in the plurality of vertices in the neighborhood by mapping the respective vertex via a discrete equivalent of a Riemannian logarithm map in a tangent plane.

16. The non-transitory computer-readable medium of claim 13, wherein determining the linear transformation configured to parallel transport signals along the plurality of vertices in the mesh to the target vertex comprises aligning a tangent space at each respective vertex in the plurality of vertices, other than the target vertex, to be parallel to a tangent space of the target vertex before translating a vector between the respective vertex and the target vertex.

17. The non-transitory computer-readable medium of claim 13, wherein the gauge equivariant convolution filter is anisotropic.

18. The non-transitory computer-readable medium of claim 13, wherein the method further comprises providing the convolution output to another layer of a gauge equivariant geometric graph convolutional neural network.

19. A processing system, comprising:
  means for determining a plurality of vertices in a neighborhood associated with a mesh including a target vertex, the plurality of vertices being associated with a set of input features input into a convolutional layer of a neural network;
  means for determining a linear transformation configured to parallel transport signals along all edges in the mesh to the target vertex;
  means for applying the linear transformation to the plurality of vertices in the neighborhood to form a combined signal at the target vertex;
  means for determining a set of basis filters configured to maintain gauge equivariance for each respective mesh corresponding to a respective representation sample;
  means for linearly combining the basis filters using a set of learned parameters to form a gauge equivariant convolution filter, wherein the gauge equivariant convolution filter is constrained to maintain gauge equivariance;
  means for transforming the combined signal to a regular representation with a plurality of representation samples, wherein each representation sample in the plurality of representation samples is rotated with respect to each other representation sample in the plurality of representation samples;
  for each respective representation sample in the plurality of representation samples:
    means for rotating the gauge equivariant convolution filter according to the rotation of the respective representation sample, and
    means for applying the rotated gauge equivariant convolution filter to the respective representation sample;
  means for applying the gauge equivariant convolution filter to the combined signal to form an intermediate output;
  means for applying a gauge equivariant nonlinearity to the intermediate output to form a convolution output; and
  means for generating, using the neural network, an inference, based on the convolution output.

20. The processing system of claim 19, further comprising:
  means for determining a non-uniform discrete Fourier transform matrix for the neighborhood; and
  means for generating the gauge equivariant convolution filter for the neighborhood based on the non-uniform discrete Fourier transform matrix.

21. The processing system of claim 19, further comprising means for encoding a local geometry of each respective vertex in the plurality of vertices in the neighborhood by mapping the respective vertex via a discrete equivalent of a Riemannian logarithm map in a tangent plane.

22. The processing system of claim 19, wherein the means for determining the linear transformation configured to parallel transport signals along the plurality of vertices in the mesh to the target vertex is further configured for aligning a tangent space at each respective vertex in the plurality of vertices, other than the target vertex, to be parallel to a tangent space of the target vertex before translating a vector between the respective vertex and the target vertex.

* * * * *